United States Patent
Sato et al.

(10) Patent No.: US 7,728,100 B2
(45) Date of Patent: Jun. 1, 2010

(54) PROCESS FOR PRODUCING POLYGLYCOLIC ACID RESIN COMPOSITION

(75) Inventors: Hiroyuki Sato, Iwaki (JP); Fuminori Kobayashi, Iwaki (JP); Fumio Akutsu, Iwaki (JP); Katsushi Momose, Tokyo (JP)

(73) Assignee: Kureha Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/992,163

(22) PCT Filed: Sep. 20, 2006

(86) PCT No.: PCT/JP2006/318581

§ 371 (c)(1),
(2), (4) Date: Mar. 18, 2008

(87) PCT Pub. No.: WO2007/034805

PCT Pub. Date: Mar. 29, 2007

(65) Prior Publication Data

US 2009/0118462 A1    May 7, 2009

(30) Foreign Application Priority Data

Sep. 21, 2005    (JP) .............................. 2005-273958

(51) Int. Cl.
*C08G 63/02*   (2006.01)
*C08G 63/00*   (2006.01)

(52) U.S. Cl. ........................... 528/272; 284/5; 528/271; 528/361; 560/179; 560/185; 562/587

(58) Field of Classification Search ..................... 264/5; 528/271, 272, 361; 560/179, 185; 562/587
See application file for complete search history.

(56) References Cited

U.S. PATENT DOCUMENTS

2005/0032947 A1    2/2005    Takahashi et al.

FOREIGN PATENT DOCUMENTS

| JP | 2000-302855 | 4/1999 |
|---|---|---|
| JP | 2000-302855 | 10/2000 |
| JP | 2001-064400 | 3/2001 |
| JP | 2005-053870 | 8/2003 |
| JP | 2005-246718 | 3/2004 |
| JP | 2005-162873 | 6/2005 |
| JP | 2005-246718 | 9/2005 |
| WO | WO2005/090438 | 9/2005 |

OTHER PUBLICATIONS

International Search Report of PCT/JP2006/318581 mailed Oct. 17, 2006.
PCT International Preliminary Report on Patentability and Written Opinion of the International Searching Authority mailed Sep. 9, 2008, in English.

*Primary Examiner*—Terressa M Boykin
(74) *Attorney, Agent, or Firm*—Reed Smith LLP

(57) ABSTRACT

A particulate polyglycolic acid resin composition suitable as a material for various forming processes in produced through a process characterized by comprising: cooling a polyglycolic acid resin composition having a residual glycolide content of at most 0.6 wt. % in a molten state by contact with an aqueous cooling medium to solidify the composition, and pelletizing the composition.

8 Claims, No Drawings

PROCESS FOR PRODUCING POLYGLYCOLIC ACID RESIN COMPOSITION

This application is the United States national stage of International Application No. PCT/JP2006/318581, filed Sep. 20, 2006, which was published under PCT Article 21 in Japanese as International Publication No. WO/2007/034805 and which claims benefit of Japanese Application No. 2005-273958 filed Sep. 21, 2005.

TECHNICAL FIELD

The present invention relates to a process for producing a particulate polyglycolic acid resin composition which is suitable as a starting material for various forming processes, such as injection molding, film forming, sheet forming, and blow molding.

BACKGROUND ART

Among aliphatic polyesters considered to give little load to the natural environment due to their biodegradability or hydrolyzability, polyglycolic acid resin has a particularly extensive decomposability, is excellent in mechanical strengths such as tensile strength and in gas-barrier property when formed into a film or sheet, and is therefore expected to be used as fishery materials, such as fishing yarns, fishery nets and culturing nets, agricultural material, or various packaging (container) materials (e.g., Patent documents 1-3 listed below). However, the severe hydrolyzability of polyglycolic acid resin has frequently provided a factor of obstructing the application thereof. For example, in the case of obtaining various forms, such as filament, film and sheet, an ordinary thermoplastic resin is generally melted, cooled, solidified and pelletized to obtain a particulate forming resin material, which is then supplied for various forming processes. However, regarding the cooling step among the above-mentioned series of steps, cooling with water has been believed impossible or impractical for polyglycolic acid resin having severe hydrolyzability. This is because polyglycolic acid resin is hydrolyzed in a stage when a melt thereof is introduced into water to be cooled, thus resulting in a polyglycolic acid resin having a lower molecular weight which slows a non-ignorable degree of lowering in moisture resistance (i.e., a further lowering in molecular weight due to further hydrolysis under the condition of use thereof and an accompanying lowering in practical strength). Incidentally, Patent document 4 listed below discloses a method of crystallization of aliphatic polyesters including a polyglycolic acid resin, comprising: causing an aliphatic polyester in a solid state, a molten state or a solution state to contact a liquid including water to solidify and crystallize the aliphatic polyester, but no working example is disclosed regarding polyglycolic acid resin. For the above-mentioned reason, the cooling subsequent to melting for formation of particulate forming material of polyglycolic acid resin has been effected by air cooling (i.e., cooling by contact with air). According to the present inventors' experience, however, when a melt-extrudate (strand) of polyglycolic acid resin is solidified by air cooling, for example, the strands after solidification are distorted and, when pelletized (e.g., into cylindrical pellets) by means of a cutter, etc., provide a particulate product having a broad particle size distribution, which is inconvenient for a subsequent product forming step. Further, when the number of strands is increased in order to increase the productivity, inconveniences, such as entanglement and adhesion of the strands, are liable to occur.

Patent document 1: WO2003/037956A1
Patent document 2: JP10-60136A
Patent document 3: WO2005/072944A1
Patent document 4: JP2000-302855A

DISCLOSURE OF INVENTION

Accordingly, a principal object of the present invention is to provide a particulate polyglycolic acid resin composition suitable as a starting material for various forming processes, particularly a process for effective production thereof.

According to the study of the present inventors, it has been discovered that the above-mentioned hydrolysis of molten polyglycolic acid resin in the water cooling step is associated with the glycolide content in the molten polyglycolic acid resin and, if the glycolide content is suppressed to a certain level or below by an appropriate means, the hydrolysis and lowering in moisture resistance of the polyglycolic acid resin during water cooling can be suppressed within a tolerable extent, and it becomes also possible to uniformize the particle size distribution of the particulate product.

The process for producing a particulate polyglycolic acid resin composition is based on the above findings and comprises: cooling a polyglycolic acid resin composition having a residual glycolide content of at most 0.6 wt. % in a molten state by contact with an aqueous cooling medium to solidify the composition, and pelletizing the composition.

According to the process of the present invention, it becomes possible to effectively produce a polyglycolic acid resin composition having a narrow particle size distribution as represented by a variation coefficient of particle size of at most 7%.

BEST MODE FOR PRACTICING THE INVENTION

Hereinbelow, the process for producing a particulate polyglycolic acid resin composition according to the present invention will be described with reference to preferred embodiments thereof.

(Polyglycolic Acid Resin)

The polyglycolic acid resin (hereinafter, sometimes referred to as "PGA resin") includes homopolymer of glycolic acid (PGA, inclusive of a ring-opening polymerization product of glycolide (GL) which is a bimolecular cyclic ester of glycolic acid) consisting only of glycolic acid recurring unit represented by a formula: —($O.CH_2.CO$)— ... (1), and also a glycolic acid copolymer containing at least 70 wt. % of the above-mentioned glycolic acid recurring unit.

Examples of comonomers for providing the polyglycolic acid copolymer together with the glycolic acid monomer such as glycolide, may include: cyclic monomers, inclusive of ethylene oxalate (i.e., 1,4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanonic acid and δ-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters; and two or more species of these. These monomers may be replaced by polymers thereof which can be used as a starting material for providing a polyglycolic acid copolymer together with the above-mentioned glycolic acid monomer such as glycolide.

The above-mentioned glycolic acid recurring unit should occupy at least 70 wt. %, preferably at least 90 wt. %, of the PGA resin. If the content is too small, the strength or the gas-barrier property expected of PGA resin becomes scarce. As far as this is satisfied, the PGA resin can comprise two or more species of polyglycolic acid (co)polymers in combination.

The PGA resin may preferably have a molecular weight (Mw (weight-average molecular weight based on polymethyl methacrylate) of $3\times10^4$-$8\times10^5$, particularly $5\times10^4$-$5\times10^5$, as measured by GPC measurement using hexafluoroisopropanol solvent. If the molecular weight is too small, the resultant form product is liable to have an insufficient strength. On the other hand, too large a molecular weight is liable to result in difficulties in melt-extrusion, forming and processing.

The polyglycolic acid resin composition (hereinafter, also referred to as "PGA resin composition") of the present invention can comprise the above-mentioned PGA resin alone but may preferably contain a carboxyl group-capping agent and/or a thermal stabilizer in order to improve the moisture resistance and thermal stability of the final form product. These additives can be mixed with the particulate PGA resin obtained by the present invention to provide a forming material prior to the forming, but may preferably be added prior to the pelletization of the PGA resin composition of the present invention. Particularly, by adding a thermal stabilizer prior to the melting of the PGA resin, it becomes possible to attain an effect of suppressing the increase of glycolide content during the melting (and mixing) process of the PGA resin composition before the water cooling step in the process of the present invention.

As the carboxyl group-capping agent, it is generally possible to use compounds having a function of capping a carboxyl terminal and known as an agent for improving moisture resistance of aliphatic polyesters, such as polylactic acid. Examples thereof may include: carbodiimide compounds inclusive of monocarbodiimides and polycarbodiimides, such as N,N-2,6-diisopropylphenylcarbodiimide; oxazoline compounds, such as 2,2'-m-phenylene-bis(2-oxazoline), 2,2'-p-phenylene-bis(2-oxazoline), 2-phenyl-2-oxagoline, and styrene-isopropenyl-2-oxazoline; oxazine compounds, such as 2-methoxy-5,6-dihydro-4H-1,3-oxazine; and epoxy compounds, such as N-glycidylphthalimide, cyclohexene oxide, and tris (2,3-epoxypropyl) isocyanurate. Among these, carbodiimide compounds and epoxy compounds are preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the PGA resin.

Further, preferred examples of the thermal stabilizer may include: phosphoric acid esters having a pentaerythritol skeleton and alkyl phosphate or phosphite esters having an alkyl group of preferably 8-24 carbon atoms, and some preferred specific examples thereof are disclosed in WO2003/037956A1 (the disclosure of which is intended to be incorporated herein by reference). These thermal stabilizers may preferably be used in a proportion of at most 3 wt. parts, more preferably 0.003-1 wt. part, per 100 wt. parts of the PGA resin.

According to the process of the present invention, the above-mentioned PGA resin composition is subjected to melting (and mixing) by heating to a temperature range of preferably 230-280° C., more preferably 240-270° C. The melting (and mixing) means may basically be any one, inclusive of a stirring machine and a continuous kneader, but may preferably comprise an extruder (e.g., an equi-directionally rotating twin-screw extruder) allowing a short-time processing and a smooth transfer to a subsequent cooling step for the heat-melting (and mixing) therein. If the heat-melting temperature is below 230° C., the effect of additives, such as the carboxyl group-capping agent and thermal stabilizer, is liable to be insufficient. On the other hand, in excess of 280° C., the PGA resin composition is liable to be colored.

According to the present invention, the glycolide content in the molten PGA resin composition after the melting (and mixing) and prior to the cooling with an aqueous cooling medium, is suppressed to at most 0.6 wt. %, preferably at most 0.3 wt. %, whereby the hydrolysis of the PGA resin during the water cooling is suppressed. For the suppression of the glycolide content in the molten PGA resin composition, any of (a) lowering in glycolide content in the starting PGA resin, (b) the incorporation of a thermal stabilizer as descried above, and (c) discharge of glycolide having a relatively low boiling point, e.g., through a vent port of an extruder for the melt-mixing, is effective, and by appropriately combining these measures, the glycolide content of at most 0.6 wt. % is accomplished. It is particularly preferred to lower the glycolide content of the starting PGA resin composition (a) in advance to below 0.5 wt. %, further at most 0.3 wt. %, particularly at most 0.2 wt. %. In order to obtain such a PGA resin having a low glycolide content, it is preferred to apply a ring-opening polymerization of glycolide wherein at least a latter period of the polymerization is proceeded by way of solid-phase polymerization, and the resultant PGA resin is subjected to removal of glycolide by release to a gas phase (as disclosed in WO2005/090438A1).

As the aqueous cooling medium for contact cooling and solidification of the molten PGA resin composition having a suppressed glycolide content in the above-mentioned manner, it is possible to use water alone, or a mixture of water with a solvent mutually soluble with water, such as an alcohol or an ester. From the viewpoints of environmental sanitation, economy, heat efficiency, etc., water alone (tap water or deionized water) is preferred, but it is possible to add a soap, a surfactant, etc., in a small quantity not adversely affecting the object of the present invention.

The molten PGA resin composition is cooled and solidified by contact with a aqueous cooling medium sprayed thereto or by introduction or immersion in a bath of aqueous cooling medium.

The temperature of the aqueous cooling medium may generally be in the range of ca. 5° C. to ca. 100° C. In view of the economy and cooling efficiency, room temperature can be used without any problem, but the temperature increase of the medium by contact with the molten PGA resin composition need not be suppressed by forced cooling. Particularly, in order to smoothly proceeding with a subsequent pelletization step, it is also preferred to promote the crystallization of the PGA resin composition at this stage, and for this purpose, it is preferred that the temperature of the aqueous cooling medium is within a temperature range of the glass transition temperature (Tg) of the PGA resin composition ±30° C. It is also preferred, for example, to introduce the strands of molten PGA resin into an aqueous cooling medium at a temperature around such a glass transition temperature (ordinarily 40-50° C.) of the PGA resin to effect the cooling for a relatively short period, and withdraw the PGA resin having an inner portion thereof in a stage of yet insufficient cooling to proceed with the crystallization of the PGA resin by heat from the inner portion thereof.

The molten PGA resin composition may be cooled by introduction into a bath of aqueous cooling medium or by spraying of aqueous cooling medium. From the viewpoint of cooling efficiency, a countercurrent contact between the bath of aqueous cooling medium and the molten extruded strands of PGA resin composition is preferred but, in this case, the temperature of the PGA resin composition finally contacting the cooling bath becomes close to the temperature of the introduced aqueous cooling medium, and this is not desirable from the viewpoint of promotion of the crystallization. Accordingly, it is also preferred to effect a concurrent flow contact with a bath of aqueous cooling medium or spraying of a circulating aqueous cooling medium at an elevated temperature.

In any case, if the crystallization in the cooling step of PGA resin composition is insufficient, it is possible to place an additional step for promoting the crystallization after solidification by the cooling and before the pelletization and/or after the pelletization. The medium for this purpose may suitably be an aqueous medium at a temperature in a temperature range of from the Tg of PGA resin composition to ca. 100° C., or heated air at a somewhat higher temperature.

The cooling and pelletization of the PGA resin composition can be effected simultaneously, if the molten PGA resin composition is pelletized by spraying or dispersion with a rotating disk and then caused to contact an aqueous cooling medium. However, it is further preferred, as described above, to cool and solidify the strands of molten PGA resin composition by contact with an aqueous cooling medium, followed by optional crystallization, and pelletization. The pelletization (into cylindrical pellets) of the cooled and solidified strands may be performed, e.g., by means of a cutter.

The particulate PGA resin composition, preferably pelletized in the form of pellets, thus obtained through the process of the present invention, may have a particle size (in the case of a pellet, a diameter of a true sphere having an identical volume) in a range of 1-4 µm and a narrow particle size distribution as represented by a variation coefficient of particle size (=standard deviation/number-average particle size) of at most 7%, and is suitably used as a starting material for various forming processes, such as injection molding and blow molding. Further, it may have a moisture resistance as represented by a molecular weight retention percentage of at least 20%, particularly at least 30%, after storage for 3 days in an environment of 50° C., 90%.

In the present invention, it is possible to use a filler in order to impart a mechanical strength and other properties to the PGA resin composition. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples and Comparative Examples. The physical properties (or values) described in the present specification including the following description are based on those measured according to the following methods.

(1) Glycolide Content

To ca. 100 mg of a sample PGA resin(composition), 2 g of dimethyl sulfoxide containing 4-chlorobenzophenone as an internal standard at a concentration of 0.2 g/l, was added, and the mixture was heated at 150° C. for ca. 5 min. to dissolve the resin and, after being cooled to room temperature, was subjected to filtration. Then, 1 µl of the filtrate solution was taken and injected into a gas chromatography (GC) apparatus for measurement. From a value obtained from the measurement, a glycolide content was calculated in terms of wt. % contained in the polymer. The GC analysis conditions were as follows.

Apparatus: "GC-2010" made by K. K. Shimadzu Seisakusho) Column: "TC-17" (0.25 mm in diameter×30 mm in length).

Column temperature: Held at 150° C. for 5 min., heated at 270° C. at a rate of 20° C./min. and then held at 270° C. for 3 min.

Gasification chamber temperature: 180° C.

Detector: FID (hydrogen flame ionization detector) at temperature of 300° C.

In the present invention, the glycolide content in a PGA resin after heat-melting and before cooling is controlled. However, no substantial change in glycolide content was confirmed before or after the cooling, a glycolide content in pellets after cooling was used to represent a glycolide content in PGA resin before cooling.

(2) Molecular Weight Measurement

Ca. 5 g of a sample PGA resin (composition) was sandwiched between aluminum plates and heated for 3 minutes on a heat press machine at 260° C. Then, the sample was held for ca. 5 minutes under a pressure of 5 MPa, then immediately transferred to a press machine cooled with circulating water and held for ca. 5 minutes under a pressure of 5 MPa to form a transparent amorphous sheet.

From the above-prepared press sheet, ca. 10 mg of a sample was cut out and was dissolved in 10 ml of hexafluoroisopropanol (HFIP) containing sodium trifluoroacetate dissolved therein at 5 mM. Then, 20 µl of the resultant sample solution was filtrated through a 0.1 µm-membrane filter made of polytetrafluoroethylene and then injected into a gel permeation chromatography (GPC) apparatus for measurement of molecular weight under the following conditions. Incidentally, the sample was injected into the GPC apparatus within 30 minute after the dissolution.

<GPC Measurement Conditions>

Apparatus: "Shodex-104" made by Showa Denko K.K.

Column: Two columns of "HFIP-606M" were connected in series with 1 column of "HFIP-G" as a pre-column.

Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

(3) Moisture Resistance Evaluation

Ca. 1 g of a pellet sample was sandwiched between aluminum plates and heated for 3 minutes on heat press machine at 260° C. Then, the sample was held for 1 minute under a pressure of 5 MPa and then immediately transferred to a press machine cooled with circulating water to be cooled to form a transparent amorphous press sheet. The press sheet thus formed was then heat-treated for 10 minutes at 80° C. in the state of being sandwiched between the aluminum plates.

Ca. 10 mg of a sample was cut out from the press sheet prepared through the above operation and held for 3 days in a constant temperature and humidity chamber held at a temperature of 50° C. and relative humidity of 90%. The sample was taken out after the 3 days and measured with respect to a molecular weight by gel permeation chromatography (GPC). A molecular weight retentivity was calculated from the measured molecular weight and a molecular weight of sample before being placed in the constant temperature and humidity chamber, and a moisture resistance was evaluated based on the molecular weight retentivity.

[Carboxyl Group Concentration]

From a press sheet prepared in the same manner as a sample for evaluating moisture resistance, a sample was cut, accurately weighed at ca. 0.3 g and completely dissolved in 10 ml of dimethyl sulfoxide of a reagent grade on an oil bath for ca. 3 min. Two drops of an indicator (0.1 wt. % Bromothymol Blue/methyl alcohol solution) was added, and further a 0.02 normal-sodium hydroxide/benzyl alcohol solution was gradually added thereto until a termination point where the color of the solution changed from yellow to green by observation with eyes. From the amount of the dropped sodium hydroxide solution, a carboxyl group concentration was calculated in terms of equivalents per t (ton) of PGA resin.

(4) Variation Coefficient of Particle Size

From a produced PGA resin pellet product, 20 cylindrical pellets were selected at random, their particle sizes were determined for each cylindrical pellet as a diameter of a true sphere having an identical volume, and from the determined particle sizes, a variation coefficient of particle size was calculated as a standard deviation of particle size/a number-average particle size.

(5) State of Strands

A state of melt-extruded strands of PGA resin composition and a state of the strands after cooling and before pelletization were observed with eyes and evaluated according to the following standard:

A: The strands were free from distortion and stable.
C: The strands were distorted and unstable.

(Synthesis Example of PGA Resin)

Into a closable vessel (glycolide dissolution vessel) equipped with a steam jacket structure, 22.5 kg of glycolide, 0.68 g (30 ppm) of tin chloride dihydrate and 21.8 g of n-dodecyl alcohol were added and, after closing the vessel, steam was circulated in the jacket to melt the contents by heating up to 100° C., thereby forming a uniform liquid. While keeping the temperature of the contents at 100° C., they were transferred to an apparatus comprising tubes made of a metal (SUS304) and each having an inner diameter of 24 mm. The apparatus was composed of a body part including the tubes, and upper and lower plates. The body part and the upper and lower plates were respectively provided with jackets, through which a heat transfer oil could be circulated. When the contents were transferred to this apparatus which had been provided with the lower plate and, immediately after the transfer, the upper plate was affixed.

A heat transfer oil at 170° C. was circulated into the jackets of the body part and the upper and lower plates, and the contents were held for 7 hours to obtain a PGA resin having a weight-average molecular weight of $2.3 \times 10^5$ and a glycolide content of 0.2 wt. %.

Example 1

To the PGA resin obtained in the above Synthesis Example, 300 ppm of an almost equi-molar mixture of mono- and di-stearyl acid phosphate ("AX-71" (trade name), made by Asahi Denka Kogyo K. K.) was added, and the resultant mixture was melt-kneaded and extruded through a twin-screw kneading extruder ("LT-20", made by K. K. Toyo Seiki Seisakusho) having zones C1-C4 from the feed port to the discharge port set at temperatures of 220° C., 230° C., 240° C. and 230° C., respectively, to form a strand of the PGA resin through a die having a single-strand bore, which strand was then introduced into a water bath filled with water at ca. 65° C. to be cooled for 5 seconds to be solidified. Then, the solidified strand was taken up from the water bath, exposed to air at ca. 25° C. for ca. 10 seconds and pelletized (into cylindrical pellets) by a pelletizer equipped with a rotary cutter while being pulled up at a constant speed, to obtain PGA pellets having an average particle size of 1.5 mm, a standard deviation of 0.05 mm and a variation coefficient of 3%, a glycolide content of 0.19 wt. %, a weight-average molecular weight of $2.31 \times 10^5$ and a carboxyl group concentration of 9 equivalents/t.

As an intermediate state, it was confirmed by eye observation that the melt-extruded strand was not distorted but straight during the cooling and stably conveyed to the pelletizer to be pelletized (into cylindrical pellets). The strand after the cooling tuned into white and the progress of the crystallization thereof was confirmed. As a result of the moisture resistance evaluation, the thus-obtained pellets exhibited a molecular weight of $1.13 \times 10^3$ and thus a molecular weight-retention of 49% after 3 days of storage at 50° C. and 90%-relative humidity.

The cooling condition and property evaluation of the above Example and summarized in Table 1 appearing hereinafter together with Examples and Comparative Examples described below.

Comparative Example 1

PGA resin pellets were prepared and evaluated in the same manner as in Example 1 except that the PGA resin strand extruded out of the die of the extruder was placed on a meshed conveyer and blown twice with dry air (dew point=−50° C.) at ca. 25° C. for ca. 15 seconds in air to be solidified. As an intermediate state, it was confirmed by eye observation that the melt-extruded strand was distorted during the cooling on the conveyer and jumped up from the conveyer, thus being unstable. The strand after the cooling turned white similarly as in Example 1 and the progress of the crystallization thereof was confirmed.

Example 2

PGA resin pellets were prepared and evaluated in the same manner as in Example 1 except that the thermal stabilizer "AX-71" was replaced by 300 ppm of cyclic neopenta-tetrail-bis(octadecyl phosphite) ("ADEKASTAB PEP-8" (trade name), made by Asahi Denka Kogyo K. K.). The strand during the cooling was stable similarly as in Example 1 and the whitening thereof was confirmed by observation with eyes.

Comparative Example 2

PGA resin pellets were prepared and evaluated in the same manner as in Example 2 except that the PGA resin strand extruded out of the die of the extruder was placed on a meshed conveyer and cooled with dry air (dew point=−50° C.) at ca. 25° C. for ca. 15 seconds to be solidified similarly as in Comparative Example 1. The strand during the cooling was unstable similarly as in Comparative Example 1 and the whitening thereof was confirmed by observation with eyes.

Example 3

PGA resin pellets were prepared and evaluated in the same manner as in Example 1 except that, to the PGA resin, 0.5 wt. % of N,N-2,6-diisopropylphenylcarbodiimide (made by Kawaguchi Kagaku Kogyo K. K.) was added as a carboxyl group-capping agent to the PGA resin in addition to the 300 ppm of the thermal stabilizer "AX-71". The strand during the cooling was stable similarly as in Example 1 and the whitening thereof was confirmed by observation with eyes.

Example 4

PGA resin pellets were prepared and evaluated in the same manner as in Example 1 except that the strand extruded out of the die of the extruder was placed on a mesh conveyer and introduced into a water bath filled with water at ca. 15° C. for 15 seconds of cooling to be solidified, and the solidified strand was exposed to air at ca. 25° C. for ca. 10 seconds. It was confirmed by observation with eyes that the strand during the cooling was stable and conveyed to a pelletizer to be pelletized (into cylindrical pellets) similarly as in Example 1. The strand after the cooling was transparent and judged to be in an amorphous state.

Comparative Example 3

PGA resin pellets were prepared and evaluated in the same manner as in Example 1 except that the thermal stabilizer "AX-71" was not used. The strand during the cooling was stable similarly as in Example 1 and the whitening thereof was confirmed by observation with eyes.

Comparative Example 4

PGA resin were prepared and evaluated in the same manner as in Comparative Example 3 except that the PGA resin strand extruded out of the die of the extruder was cooled for 15 seconds with dry air (dew point=−50° C.) at ca. 25° C. to be solidified. The strand during the cooling was unstable similarly as in Comparative Example 1 and the whiting thereof was confirmed by observation with eyes.

Example 5

A starting composition prepared by adding, to the PGA resin, 0.5 wt. % of N,N-2,6-diisopropylphenylcarbodiimide (Kawaguchi Kagaku Kogyo K. K.) as a carboxyl group-capping agent in addition to the 300 ppm of the thermal stabilizer "AX-71" similarly as in Example 3, was melt-kneaded by means of a twin-screw extruder ("TEX44 α II" made by Nippon Seikosho K. K.) having zones C1-C12 from the supply part to the discharge part set to 50° C. (C1), 180° C. (C2), 260° C. (C3-C9) and 230° C. (C10-C12), while effecting gas-evacuation at a vacuum of 0.2 torr through a vent port provided between zones C10 and C11, and extruded through a die equipped with 29 strand bores each in a diameter of 4 mm as PGA resin strands, which were introduced into a water bath at ca. 65° C. for 5 seconds of cooling to be solidified. Then, the strands taken up onto a mesh-conveyer and blown three times with air at ca. 25° C. for ca. 10 seconds of exposure to the air, and then pelletized (into cylindrical pellets) by means of a cutter equipped with a rotary cutter while being pulled at a constant speed, to obtain PGA resin pellets which were then evaluated. It was confirmed by observation with eyes that the strands during the cooling were substantially free from distortion and straight and stably conveyed to the pelletizer to be pelletized (into cylindrical pellets). The strands after the cooling turned white similarly as in Example 1, and the crystallization thereof was confirmed.

Comparative Example 5

PGA resin pellets were prepared and evaluated in the same manner as in Example 5 except that the PGA resin strands extruded out of the die of the extruder were placed on a meshed conveyer and blown 5 times with dry air (dew point=ca.−50° C.) for 30 seconds of cooling to be solidified. It was confirmed by observation with eyes that strands during the cooling were distorted to be unsettled on the conveyer and often caused bonding between strands. The strands after the cooling turned white similarly as in Example 1, and the progress of the crystallization thereof was confirmed.

The outlines of the results of the above Examples and Comparative Examples are inclusively shown in the following Table 1.

TABLE 1

| | Example | 1 | Comp. 1 | 2 | Comp. 2 | 3 | 4 | Comp. 3 | Comp. 4 | 5 | Comp. 5 |
|---|---|---|---|---|---|---|---|---|---|---|---|
| Main cooling | Cooling medium | water | air | water | air | water | water | water | air | water | air |
| | Temperature (° C.) | 65 | 25 | 65 | 25 | 65 | 15 | 65 | 25 | 65 | 25 |
| | Time (sec.) | 5 | 15 | 5 | 15 | 5 | 10 | 6 | 15 | 5 | 30 |
| Glycolide content (wt. %) | | 0.19 | 0.22 | 0.55 | 0.54 | 0.27 | 0.28 | 1.05 | 1.04 | 0.12 | 0.13 |
| Evaluation | Carboxyl group-concentration (eg./t) | 9 | 9 | 11 | 9 | 3 | 3 | 13 | 9 | 3 | 3 |
| | State of strand | A | C | A | C | A | A | A | C | A | C |
| | Variation coefficient of particle size (%) | 3 | 10 | 5 | 9 | 6 | 4 | 4 | 10 | 3 | 10 |
| | Moisture resistance *: (%) | 49 | 47 | 30 | 32 | 52 | 50 | 12 | 16 | 61 | 60 |

*: Molecular weight retention (%) after storage for 3 days at 50° C./99% RH.

INDUSTRIAL APPLICABILITY

As is understood from the results of Table 1, according to Examples of the present invention, it was possible to efficiently produce particulate PGA resin compositions having a narrow particle size distribution and suitable as a material for various forming processes, by subjecting a molten polyglycolic acid resin composition having a glycolide content which has been reduced by various means, such as lowering of glycolide content in the starting PGA resin, addition of a thermal stabilizer and vent as an auxiliary means, to water-cooling and solidification and pelletization. In contrast thereto, Comparative Examples 1, 2, 4 and 5 having adopted air cooling instead of water cooling, all caused instability of melt-extruded strands and much distortion after cooling, which resulted in pellets having a broad particle size distribution (a large variation coefficient of particle size). Further, the PGA resin pellets obtained through water cooling of a molten PGA resin composition having a large glycolide content (Comparative Example 3) resulted in an increase in carboxyl group concentration and a lower moisture resistance.

The invention claimed is:

1. A process for producing a particulate polyglycolic acid resin composition, comprising: melt-extruding 100 wt. parts of a polyglycolic acid resin together with at most 3 wt. parts of a thermal stabilizer selected from the group consisting of alkyl phosphate and phosphite esters each having an alkyl group of 8-24 carbon atoms to form a polyglycolic acid resin composition having a residual glycolide content of at most 0.6 wt. % in a molten state, cooling the polyglycolic acid resin composition by contact with an aqueous cooling medium to solidify the composition, and pelletizing the composition.

2. A production process according to claim 1, further including a step of crystallizing the PGA resin after the solidification and before and/or after the pelletization.

3. A production process according to claim 1 wherein the aqueous cooling medium is in a temperature range of from ca. 5° C. to ca. 100° C.

4. A production process according to claim 1 wherein the aqueous cooling medium is water.

5. A production process according to claim 1 wherein the polyglycolic acid resin composition in a molten state has a glycolide content of at most 0.3 wt. %.

6. A production process according to claim 1 wherein the polyglycolic acid resin composition in a molten state contains a carboxyl group-capping agent.

7. A particulate polyglycolic acid resin composition produced through a production process according to claim 1 and having a variation coefficient of particle size of at most 7%.

8. A particulate polyglycolic acid resin composition according to claim 7, exhibiting a molecular weight-retention percentage of at least 20% after 3 days of storage in an environment of 50° C. and 90%.

* * * * *